March 25, 1952
L. E. MILLER
2,590,559
COVER MEANS FOR TERMINALS OF
DYNAMOELECTRIC MACHINES
Filed Aug. 12, 1950
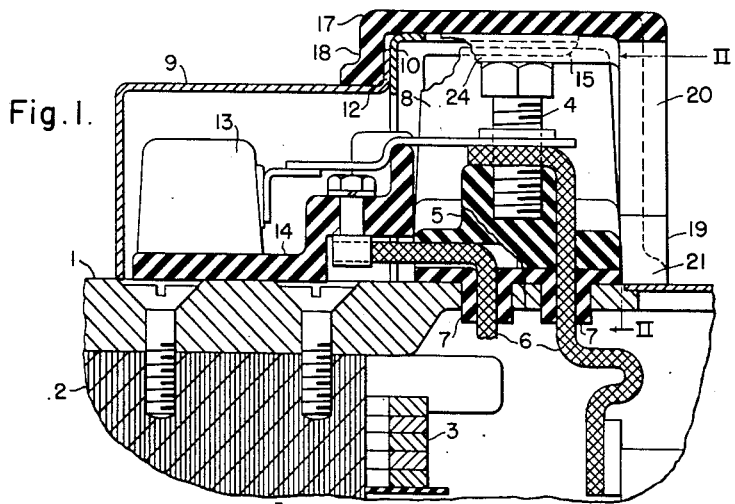
Fig. 1.
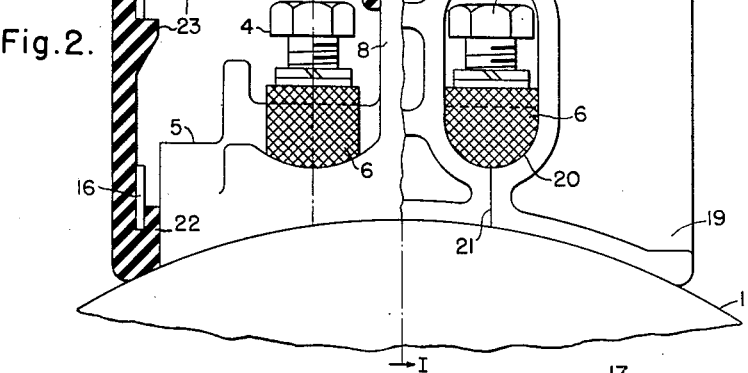
Fig. 2.
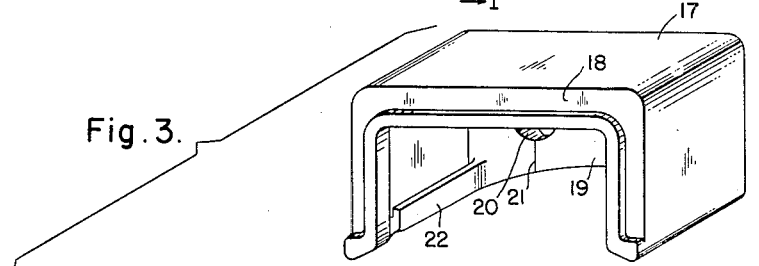
Fig. 3.
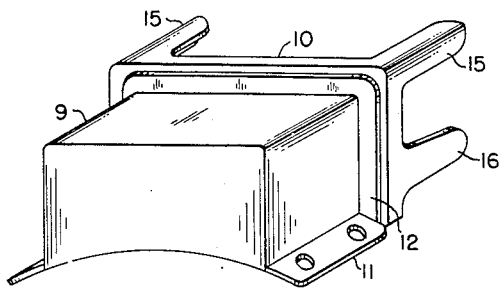
INVENTOR
Lawrence E. Miller.
BY
ATTORNEY Patented Mar. 25, 1952

2,590,559

UNITED STATES PATENT OFFICE 2,590,559

COVER MEANS FOR TERMINALS OF DYNAMOELECTRIC MACHINES

Lawrence E. Miller, Lima, Ohio, assignor to Westinghouse Electric Corporation, East Pittsburgh, Pa., a corporation of Pennsylvania Application August 12, 1950, Serial No. 179,075

2 Claims. (Cl. 171—252)

The present invention relates to dynamo-electric machines having terminal means mounted externally on the frame of the machine, and more particularly to cover means for enclosing and protecting the terminals of such machines, or of other types of electrical apparatus.

Some types of dynamo-electric machines, such as generators intended for use on aircraft, have their terminals mounted externally directly on the frame of the machine, and it is usually desirable to enclose or cover such terminals to prevent damage to them or accidental contact which might result in short-circuiting the terminals. Cast or drawn metal covers have been used for this purpose, but metal covers are not satisfactory. Cast metal covers are easily broken, leaving the terminals unprotected, and drawn covers of sheet metal are easily bent or deformed, which may result in the cover itself short-circuiting the terminals. Another disadvantage of metal covers is that they must be fastened in place by means of screws, or other fastening means which require the use of tools to remove the cover, thus making it more difficult to obtain access to the terminals when necessary.

The principal object of the present invention is to provide a cover means for external terminals of dynamo-electric machines, or other electrical apparatus, which cannot be broken or permanently deformed, and which is easily removable.

Another object of the invention is to provide a flexible, insulating cover for external terminals of dynamo-electric machines which is supported in place over the terminals on a support member in such a manner as to be easily removable.

Other objects and advantages of the invention will be apparent from the following detailed description, taken in connection with the accompanying drawing, in which:

Figure 1 is a longitudinal sectional view showing the cover means in place on a dynamo-electric machine, the section being taken approximately on the line I—I of Fig. 2, Fig. 2 is a view partly in end elevation and partly in section on the line II—II of Fig. 1, and Fig. 3 is an exploded perspective view showing the cover means and support.

The cover means of the present invention is shown in Figs. 1 and 2 of the drawing mounted in place on a direct-current aircraft generator, although it will be apparent that the cover may be applied to any type of dynamo-electric machine, or to any other type of electrical apparatus having externally mounted terminals. The generator is shown only partially in the drawing, since the construction of the machine itself is not a part of the invention, and it is shown in Fig. 1 as having a frame structure 1 which supports pole pieces 2 carrying field windings 3. The machine is provided with main terminal devices 4 mounted on a suitable mounting means or terminal board 5, which may be molded of any suitable insulating material, and which is secured directly on the frame 1 of the machine. The leads 6 from the machine pass through insulating bushings 7 in the frame 1 for connection to the terminals 4. An insulating barrier 8 may be provided between the terminals and is preferably formed integrally with the terminal board 5.

A supporting means for the cover is provided on the frame 1 adjacent the terminals 4. In the illustrated embodiment of the invention, the supporting means includes a cover part 9 and a support part 10. The cover part 9 may be a generally box-shaped member of sheet metal, or other suitable material, open at the bottom and on one side. The lower edge of the cover 9 is curved, as indicated in Fig. 3, to conform to the shape of the frame 1, and the bottom of the cover 9 is provided with flanges 11 for attachment of the cover to the frame 1 by screws or other suitable means. The open side of the cover 9 has a flange 12 extending around its periphery for attachment of the support part 10. The cover 9 may conveniently be utilized as an enclosing means for a device such as a filter capacitor 13, a thermostat, or other device which does not require ready accessibility, and which may be mounted on an insulating base 14 secured to the frame 1 within the cover 9.

The support part 10 of the supporting means may also be made of sheet metal and consists of a generally rectangular open frame having axially extending fingers 15 at its upper corners and axially extending fingers 16 near the bottom of each side. The support part 10 is secured to the flange 12 of the cover 9 by spot welding, or in any other suitable manner, to form a unitary structure which is mounted on the frame 1 with the fingers 15 and 16 extending axially past the terminals 4. It will be apparent that the cover 9 and support 10 might be made integrally if desired, and that in some instances the cover 9, as such, might be omitted or reduced in size to constitute merely a closure and mounting means for the support 10.

The support 10 supports in position a cover 17 for the terminals 4. The cover 17 is a flexible, insulating cover member, which is preferably made of a synthetic elastomeric material having good oil-resistant and heat-resistant characteristics, although the cover might be made of natural rubber if desired, or of any other suitable flexible insulating material. The cover 17, as clearly shown in Fig. 3, is a generally rectangular box-like member having the bottom and one side open. The open side is provided with a shoulder portion 18 which is adapted to fit over the support 10. The opposite side 19 of the cover has its lower edge curved to conform to the shape of the frame 1, and has openings 20 formed in it for the passage of leads from an external circuit to the terminals 4. The cover is preferably slotted below the openings 20, as indicated at 21, to facilitate removal of the cover with the external leads in place. Ribs 22 are formed near the bottom of the inside surfaces of the cover on the two longitudinal sides, forming longitudinal recesses for the reception of the fingers 16 of the support 10. Similar ribs 23 are formed on the inside surfaces adjacent the upper inside corners of the cover 17, forming longitudinal recesses for the reception of the fingers 15 of the support 10. If desired, similar longitudinal ribs 24 may be formed on the top interior surface of the cover 17, providing another longitudinal groove for receiving the top of the insulating barrier 8.

In use, the cover 17 is placed over the terminals 4 with the fingers 15 and 16 of the support 10 engaging in the longitudinal recesses formed by the ribs 22 and 23, and with the shoulder 18 of the cover engaging over the support 10, as clearly shown in Figs. 1 and 2. It will be seen that the cover is thus adequately supported in place, and encloses and surrounds the terminals 4 so that they are fully protected from damage or accidental contact. The external leads to the terminals 4 pass through the openings 20, which are of large enough size so that the cover 17 can easily be put in place after the leads have been connected to the terminals, and the slots 21 permit the cover to pass over the leads readily. It will be seen that since the cover is made of flexible, insulating material, it cannot be broken or permanently deformed, but will take accidental blows or shocks and return to its original shape without permanent damage, and without any danger of short-circuiting the terminals 4. For this reason no extra insulation is required over the terminals, and no extra insulation is required on the external leads where they pass through the cover. It will also be seen that the cover 17 is readily removable to permit access to the terminals for inspection, or other purposes, since the cover can be removed merely by lifting the shoulder 18 over the edge of the support and withdrawing the cover 17 axially from the fingers 15 and 16. The cover can easily be replaced in position by the reverse process.

It should now be apparent that an insulating cover has been provided for external terminals of dynamoelectric machines, or other electrical apparatus, which fully protects the terminals from damage or accidental contact and which is easily removable. A specific preferred embodiment of the invention has been shown and described for the purpose of illustration, but it will be apparent that various modifications may be made within the scope of the invention. It is to be understood, therefore, that the invention is not limited to the specific details shown, but in its broadest aspects, it includes all equivalent embodiments and modifications which come within the scope of the appended claims.

I claim as my invention:

1. In a dynamo-electric machine having a frame structure and terminals mounted externally on the frame structure, a support member mounted on the frame structure adjacent the terminals, said support member having fingers extending axially past the terminals, and a flexible, insulating cover member enclosing the terminals, the cover member having longitudinal recesses in its inner surface for receiving said fingers for removably supporting the cover member in place.

2. In a dynamo-electric machine having a frame structure and terminals mounted externally on the frame structure, a support member mounted on the frame structure adjacent the terminals, said support member having fingers extending axially past the terminals, and an insulating cover member enclosing the terminals, the cover member being made of an elastomeric insulating material and having longitudinal recesses in its inner surface for receiving said fingers for removably supporting the cover member in place.

LAWRENCE E. MILLER.

REFERENCES CITED

The following references are of record in the file of this patent:

UNITED STATES PATENTS

| Number | Name | Date |
| --- | --- | --- |
| 1,260,649 | Conrad | Mar. 26, 1918 |
| 1,304,522 | Bijur | May 20, 1919 |
| 2,079,052 | Tamini | May 4, 1937 |
| 2,173,843 | Hothersall | Sept. 26, 1939 |
| 2,199,787 | Dillard | May 7, 1949 |
| 2,468,225 | Murphy | Apr. 26, 1949 |
| 2,468,226 | Murphy | Apr. 26, 1949 |
| 2,488,360 | Williams | Nov. 15, 1949 |